(12) United States Patent
Mandal et al.

(10) Patent No.: US 7,167,090 B1
(45) Date of Patent: Jan. 23, 2007

(54) FAR-FIELD RF POWER EXTRACTION CIRCUITS AND SYSTEMS

(75) Inventors: Soumyajit Mandal, Cambridge, MA (US); Rahul Sarpeshkar, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 88 days.

(21) Appl. No.: 10/944,676

(22) Filed: Sep. 17, 2004

(51) Int. Cl.
*G08B 1/08* (2006.01)

(52) U.S. Cl. .................. 340/538.14; 340/538.16; 340/572.7; 235/380

(58) Field of Classification Search ............ 340/505, 340/538.14, 538.15, 538.16, 572.4, 572.7, 340/645; 343/741, 866; 607/61; 329/341, 329/370; 235/375, 380

See application file for complete search history.

(56) References Cited

U.S. PATENT DOCUMENTS

| | | | |
|---|---|---|---|
| 6,212,431 B1* | 4/2001 | Hahn et al. | 607/61 |
| 6,486,776 B1* | 11/2002 | Pollack et al. | 340/521 |
| 6,639,459 B1* | 10/2003 | Devilbiss | 329/341 |
| 6,693,599 B1* | 2/2004 | Chia et al. | 343/741 |

* cited by examiner

*Primary Examiner*—Van T. Trieu
(74) *Attorney, Agent, or Firm*—Daly, Crowley, Mofford, & Durkee, LLP

(57) ABSTRACT

A method and apparatus for performing far-field power extraction are presented. The method includes receiving an electromagnetic radiation signal, rectifying the signal to produce a direct current (D.C.) voltage and providing the D.C. voltage to a circuit. A far-field power extraction circuit includes an antenna for receiving an electromagnetic radiation signal, a rectifier for rectifying the electromagnetic radiation signal. The circuit may further include a charge pump for amplifying the rectified voltage, an impedance matching network for coupling the antenna to the rectifier and a feedback tuning circuit for optimizing performance of the extraction circuit.

25 Claims, 8 Drawing Sheets

FAR-FIELD RF POWER EXTRACTION CIRCUITS AND SYSTEMS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to power extraction and more particularly to circuits and systems for extracting power from radio frequency (RF) signals.

BACKGROUND OF THE INVENTION

Devising efficient methods for extracting DC power from electromagnetic radiation has become an important necessity for a number of applications involving self-powered devices, such as Radio Frequency Identification (RFID) tags and bionic implants. The operating range of such self-powered devices has been severely limited by the failure of existing power extraction techniques to successfully extract power from radio frequency (RF) signals having relatively low power levels. The problem of extracting DC power from electromagnetic radiation has two basic parts: collecting the incident radiated power, and then converting the collected power to DC signals which are usable by the self-powered devices.

Converting RF energy from RF signals at different frequencies is a relatively difficult problem particularly when the RF signals have relatively low power levels. Fundamentally, this problem arises because frequency conversion is generally a nonlinear operation, but all practical systems are essentially linear for small signals. In addition, nonlinear devices normally used for rectification have exponential nonlinearities with relatively large "dead zones" near the origin, i.e., nonlinear devices can be non-responsive in response to signals having voltage and current levels which are close to zero. Severe constraints can also be imposed when it is desirable to provide a self-powered device which is relatively inexpensive and environmentally robust. This limitation precludes the use of exotic devices and structures.

SUMMARY OF THE INVENTION

A method and apparatus for performing far-field power extraction are disclosed. The method includes receiving an electromagnetic radiation signal, rectifying the signal to produce a direct current (D.C.) voltage and providing the D.C. voltage to a circuit. A far-field power extraction circuit includes an antenna for receiving an electromagnetic radiation signal, a rectifier for rectifying the electromagnetic radiation signal. The circuit may further include a charge pump for amplifying the rectified voltage, an impedance matching network for coupling the antenna to the rectifier and a feedback tuning circuit for optimizing performance of the extraction circuit.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention comprises various combinations of different circuits and techniques to efficiently extract power from electromagnetic signals having relatively low electromagnetic field strengths in the far field of the transmitter, thereby substantially reducing the power threshold required for operation of self-powered devices.

Figure 1:
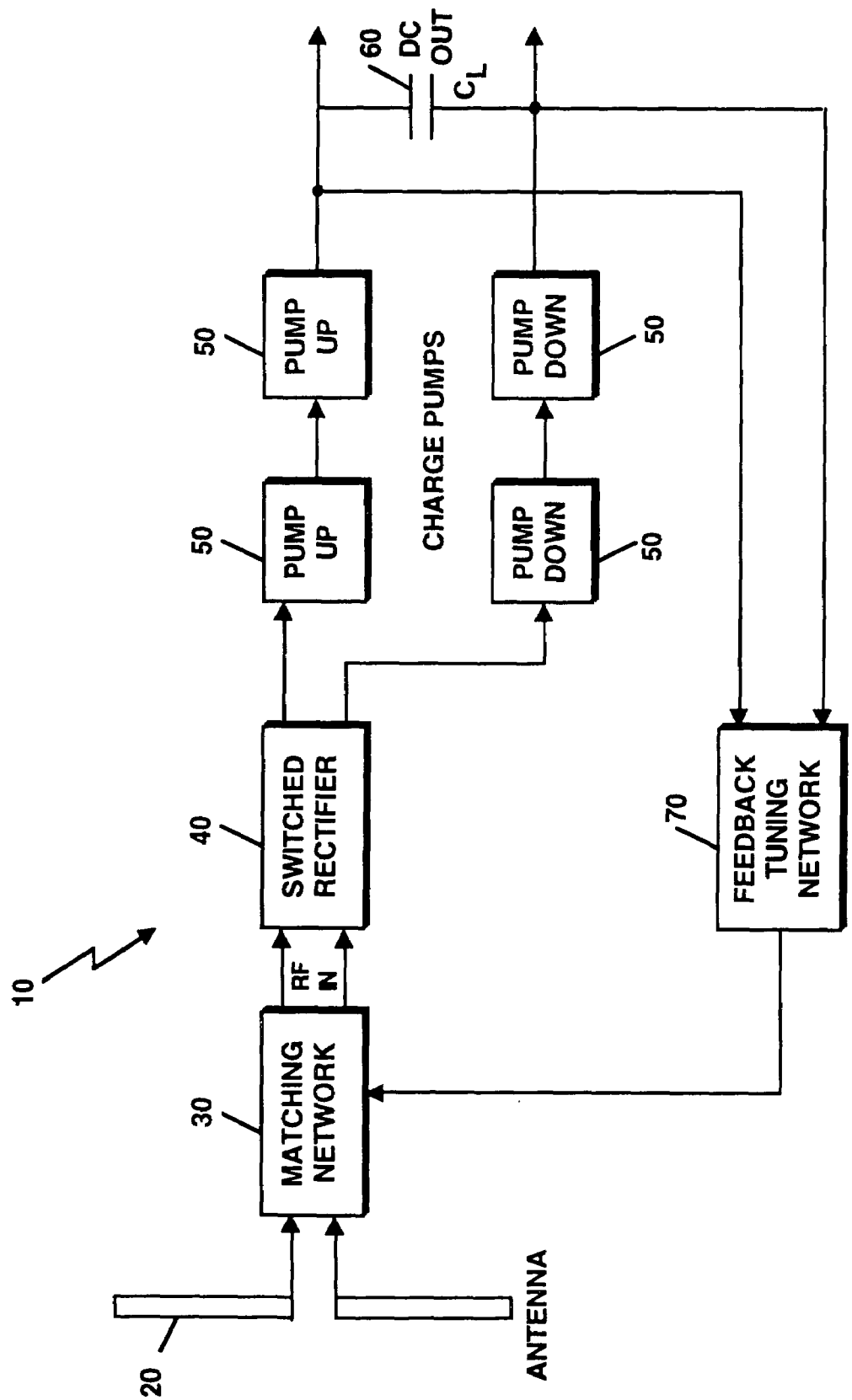
FIG. 1 is a block diagram of a power extraction system.

Referring now to FIG. 1, a block diagram of a system 10 for extracting power from electromagnetic radiation includes an antenna 20 for receiving a radio frequency (RF) signal from which direct current (DC) power will be harvested. A matching network 30 is coupled to the antenna 20 to impedance match the antenna 20 to the remainder of the system, thereby obtaining efficient power transfer. A switched rectifier 40 operates on the impedance matched differential RF signal and converts the signal to one or more DC levels. The output of the switched rectifier 40 is coupled to a group of charge pumps 50, which increase the DC levels of the voltage. The output of the charge pumps is coupled across a load capacitor 60 to provide the DC output voltage. A feedback tuning circuit 70 is coupled to the output voltage and feeds into the impedance matching network 30 to provide continuous tuning of the impedance matching network to get the maximum possible DC output.

Figure 2:
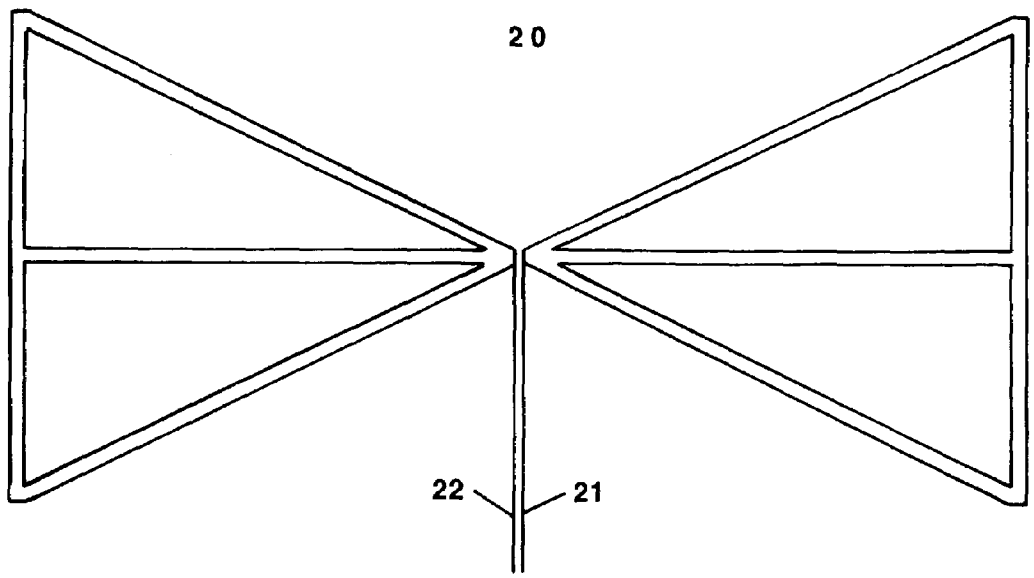
FIG. 2 is a diagram of a broadband planar dipole antenna for RF power extraction.

Referring now to FIG. 2, the antenna 20 is shown. The antenna bandwidth is defined as the frequency range over which the reflection coefficient of the antenna into a specified load impedance is less than some specified value, typically −10 dB (VSWR=2). This antenna has improved bandwidth over a simple linear dipole, while occupying approximately the same area. In a preferred embodiment the antenna 20 thus comprises a wideband dipole antenna.

It should be appreciated that although a particular dipole antenna design is shown in FIG. 2, it may be desirable to provide the antenna as a planar loop, dipole or fractal antenna. In one embodiment, the antenna 20 is provided on a flexible substrate. One objective for power collection applications is to provide a planar antenna on a flexible substrate that produces the maximum possible open circuit voltage $V_{OC}$ across the antenna terminals 21 and 22 for a given incident field strength. In addition, the antenna design has to have sufficient bandwidth to withstand bending and proximity effects, such as attachment to a dielectric surface, without moving too far off resonance. Since passive RFID systems typically use backscatter modulation to communicate with the tag reader, another factor of interest is optimization of the Radar Cross Section (RCS) modulation capabilities of the antenna.

To address these issues, the use of one or more of planar loop, dipole, bow-tie and fractal antennas is presented. Loop antennas are advantageous because most proximity (near field) effects in practice are caused by dielectric materials. Since the near field energy of loop antennas is primarily stored in the magnetic field, they are typically less susceptible to these effects than other antenna types. Bow-tie antennas are desirable when a large impedance matching bandwidth is desired, but typically require large amounts of area in order to achieve this bandwidth. Fractal antenna structures are of interest in this application since they allow the bandwidth to be increased without consuming more area, or by reducing the area required to achieve a given bandwidth. Photonic Band Gap (PBG) substrates which reduce losses due to surface wave propagation in the flexible substrate may also be utilized. PBG substrates have electrical properties (like dielectric constants) which are periodic functions of space. Solutions of Maxwell's equations in such a medium have a 'stop band', or forbidden frequency range, where no surface wave propagation is possible. This may be utilized in our application by making the stop band lie in the frequency range where the main surface wave modes propagate, thereby preventing energy loss due to such (undesirable) modes and improving the efficiency of power extraction.

Figure 3:
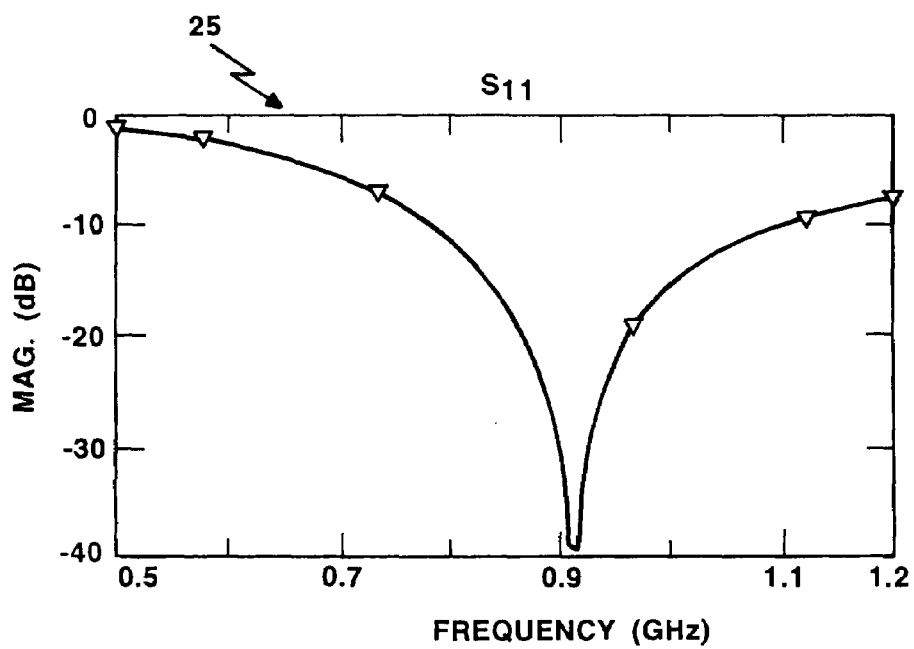
FIG. 3 is a plot showing a reflection characteristic (into a 50Ω load) of the antenna shown in FIG. 2.

Referring now to FIG. 3, a plot 25 of a simulated reflection characteristic for the antenna 20 is shown. In graph 25, $S_{11}$ is the reflection coefficient of the antenna and the substrate material used for simulations was FR-4. When simulated with a commercially available Method of Moments (MoM) based field solver, and using a criteria of a voltage standing wave ratio (VSWR) of two (VSWR≦2) this antenna 20 exhibited a fractional bandwidth of approximately 40% at a center frequency of about 900 MHz. In this implementation, the antenna occupied an area of approximately 5"×2.5".

Referring again to FIG. 2, another technique used in performing far-field RF power extraction comprises utilizing package parasitics to increase the input voltage levels to the rectifier. The far field case, when the input amplitude of the RF signal is not large enough to efficiently operate typical rectifying devices such as Schottky diodes are of particular interest. To overcome this problem, the high-Q input matching network 30 is used to passively amplify the input RF voltage. The inductance L and capacitance characteristics C(V) of network 30 are adjusted to include the effects of parasitic inductances and capacitances introduced by the chip packaging. In this way, a use for these normally unwanted parasitic characteristics has been found, as they now function as part of the matching network 30. Of course, increasing the Q also decreases the frequency range over which the system can operate and increases its sensitivity to environmental conditions, which cause the resonant frequency to drift with time. This necessitates the use of active resonant frequency control. This is implemented by the feedback tuning network shown in FIG. 1.

Another technique used in performing far-field RE power extraction comprises using traveling wave architectures for distributed voltage amplification and rectification. The matching network 30 is provided having both high voltage gain and high bandwidth at the input of the rectifier by using a cascade of exponentially tapered inductor-resistor-capacitor (L-R-C) transmission line segments. Each segment acts like a low pass filter with a certain Q and cutoff frequency. All segments have essentially the same Q, but have exponentially tapering cutoff frequencies. The cutoff frequency of the n-th section is given by:

$$f_n = exp(-n/N_{nat})$$

where $f_n$ and $N_{nat}$ are constants. Such a technique is useful for attaining high gain from many low-gain stages.

Figure 4:
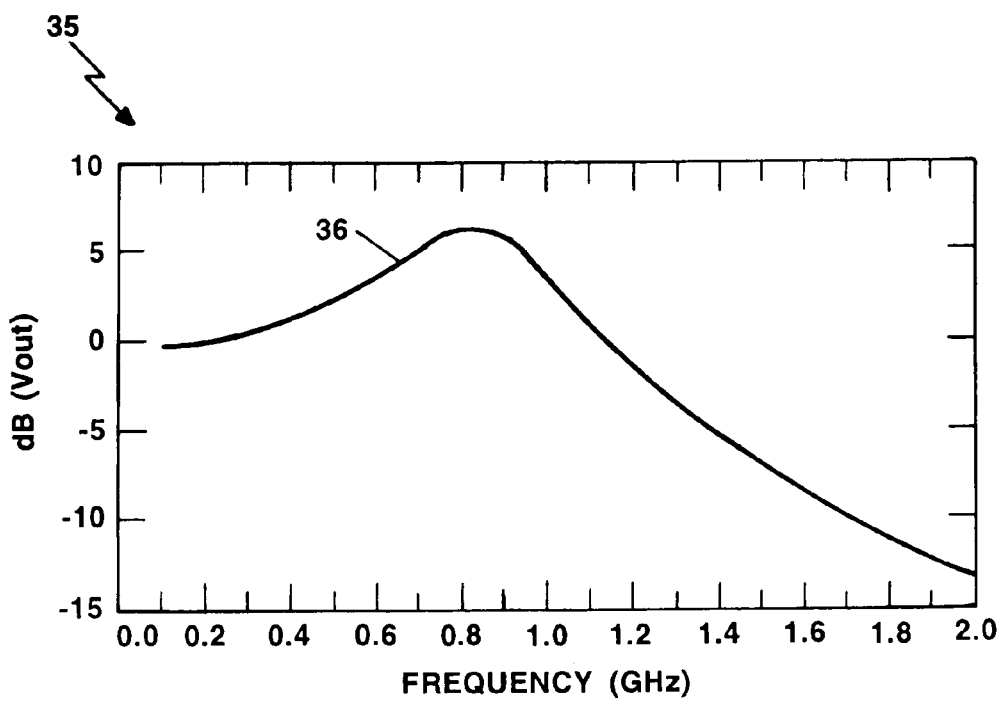
FIG. 4 is a plot of the AC transfer characteristic of an input matching network for a loaded Q of 2.

Referring now to FIG. 4, a graph 35 which shows the AC transfer characteristic of the input matching network 30 for a loaded Q of 2 and a resonant frequency of 900 MHz is shown. The curve shows that a maximum output is achieved at approximately 900 MHz. The input to the matching network is assumed to be the antenna, and its output is fed to the switched rectifier.

Figure 5:
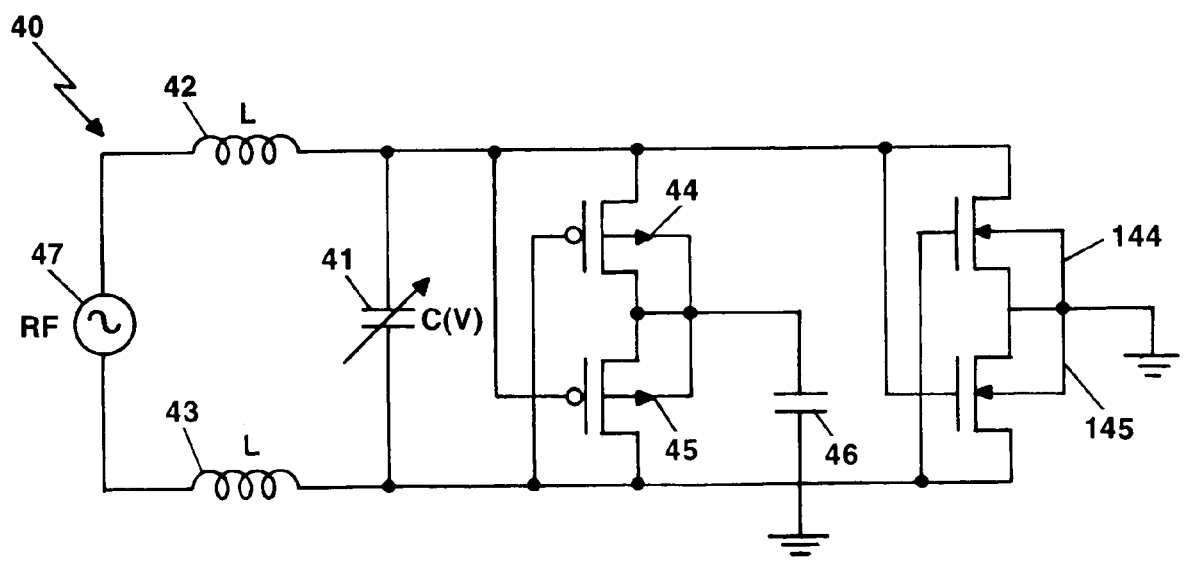
FIG. 5 is a schematic diagram of a rectifier circuit including a nonlinear capacitor and a switching rectifier.

Referring now to FIG. 5, a rectifier circuit 40 is shown. One aspect of the present invention for performing efficient power extraction comprises using parametric-amplifier-like topologies and capacitive nonlinearities for rectification instead of exponential resistive nonlinearities. Exponential resistive nonlinearities (e.g., diodes) have traditionally been used for rectification but are unsuitable at low power levels. To solve this problem, parametric-amplifier-like topologies and capacitive nonlinearities are used. FIG. 5 shows how a nonlinear capacitor (e.g. a varactor) 41 is used for rectification. The varactor 41 (which can be a reverse-biased PN junction or a MOS capacitor) has a capacitance characteristic C(V), where V is the voltage of the control terminal. V is varied at the same frequency as the input RF signal. The RF signal is applied differentially, and, as an example, V may be tied to the upper plate of the varactor. In that case, C(V) will be different on the positive and negative halves of the RF signal cycle.

Inductors 42 and 43 and varactor 41 form a high-Q circuit and are chosen to resonate at the input frequency for some value of V. Since V varies as the RF, the resonant frequency and gain of the resonator will also be different on the positive and negative halves of the RF cycle. This asymmetric signal gain leads to the development of a DC component $V_{DC}$ of voltage across the capacitor 46, i.e., rectification.

The power extraction system can be adaptively adjusted for optimal performance by using floating gate transistors as adaptive elements. The threshold voltage of floating gate transistors can be changed by adding or subtracting charge from the floating gate. A lower threshold voltage improves the performance of the switching rectifier and charge pumps described in the following sections by increasing the rectified current for a given input RF amplitude.

In addition, the highest Q that can be used for the input LC tank shown in FIG. 2 is limited by resonant frequency variations caused by environmental factors and manufacturing tolerances. This limits the passive voltage gain obtainable from the tank. To overcome this problem, a high-Q system which maintains a constant resonant frequency by adapting the C(V) characteristic appropriately is utilized. This can be done by using a floating gate MOS capacitor for C(V).

Still another technique for performing far-field RF power extraction requires using switching rectifiers to avoid voltage drops associated with diode rectifiers. By using the differential RF inputs to operate transistors as switches and not as diodes, the threshold voltage drop associated with diode rectifiers is reduced considerably. FIG. 5 shows a circuit that achieves this. When the phase of the RF input is such that gate of the upper PMOS transistor 44 is low, it turns on, drawing current from the high side of the RF input, thereby charging the load capacitor 46. The other transistor 45 is off during this phase. During the opposite RF phase, the roles of the two transistors are reversed, but the load capacitor is still charged upwards. The circuit thus acts as a full wave rectifier and charges the load capacitor $C_L$ 46 towards the positive envelope of the input RF voltage $V_{RF}$ sin(ωt). The final rectified DC voltage is determined by the resistance of the transistors and the load resistance connected to the output. It should be evident that by replacing the PMOS transistors with NMOS ones, the charging direction of the load capacitor can be reversed, i.e., charge can be made to flow out of the load capacitor, thereby decreasing the output voltage. Thus by adding a pair of NMOS devices 144, 145 in parallel with the PMOS pair 44 and 45, a negative voltage (referenced to the common mode voltage of the RF input) is generated, giving a total output DC voltage of approximately $2V_{RF}$. Note that MOSFET devices, being truly bidirectional devices, are ideally suitable for this circuit, where they are operated as switches This makes the integrated implementation of the circuit using standard low cost IC fabrication processes, such as CMOS, feasible.

Figure 6:
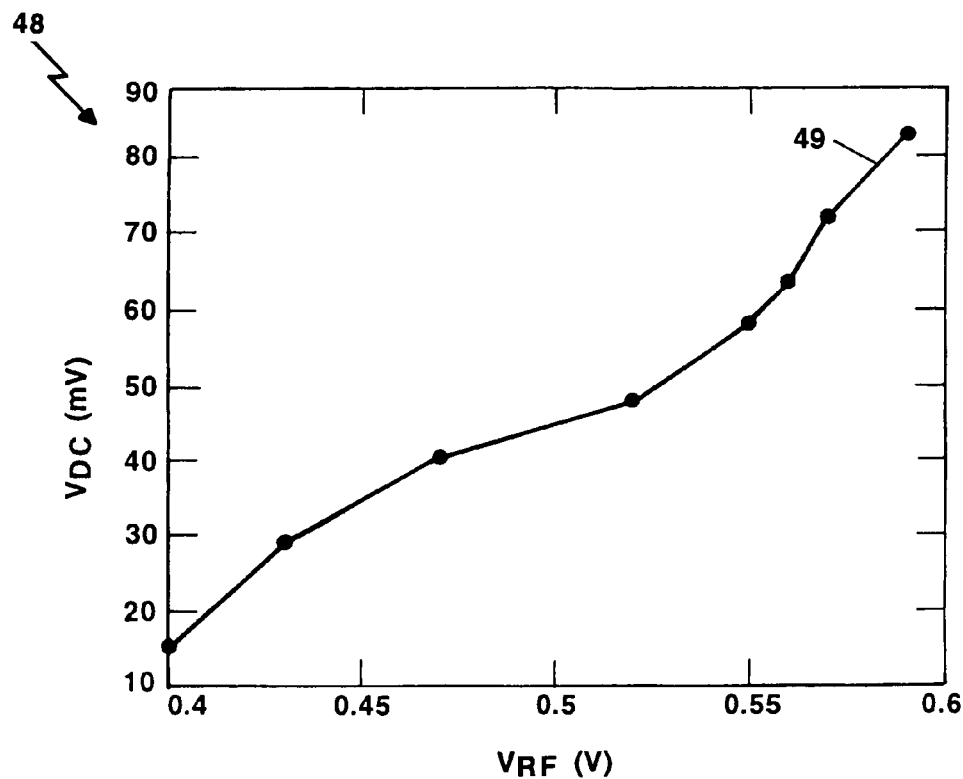
FIG. 6 is a plot of a rectification characteristic of the rectifier circuit shown in FIG. 5.

FIG. 6 comprises a graph 48 which shows the simulated rectification curve 49 for the nonlinear capacitance when it was implemented as a MOS capacitor in a 0.5 μm CMOS process. The RF input amplitude was $V_{RF}$ at 900 MHz. It can be shown that if the MOS devices operate in the sub-threshold region, this technique, which works by parametrically modulating the capacitance of a nonlinear capacitor 41, allows the DC current charging the load capacitor $C_L$ 46 to increase by a factor of cosh $$\left(\frac{\kappa V_{DC}}{V_T}\right),$$

where K is the sub-threshold body bias coefficient and the thermal voltage $$\left(\frac{\kappa V_{DC}}{V_T}\right),$$

Figure 7:
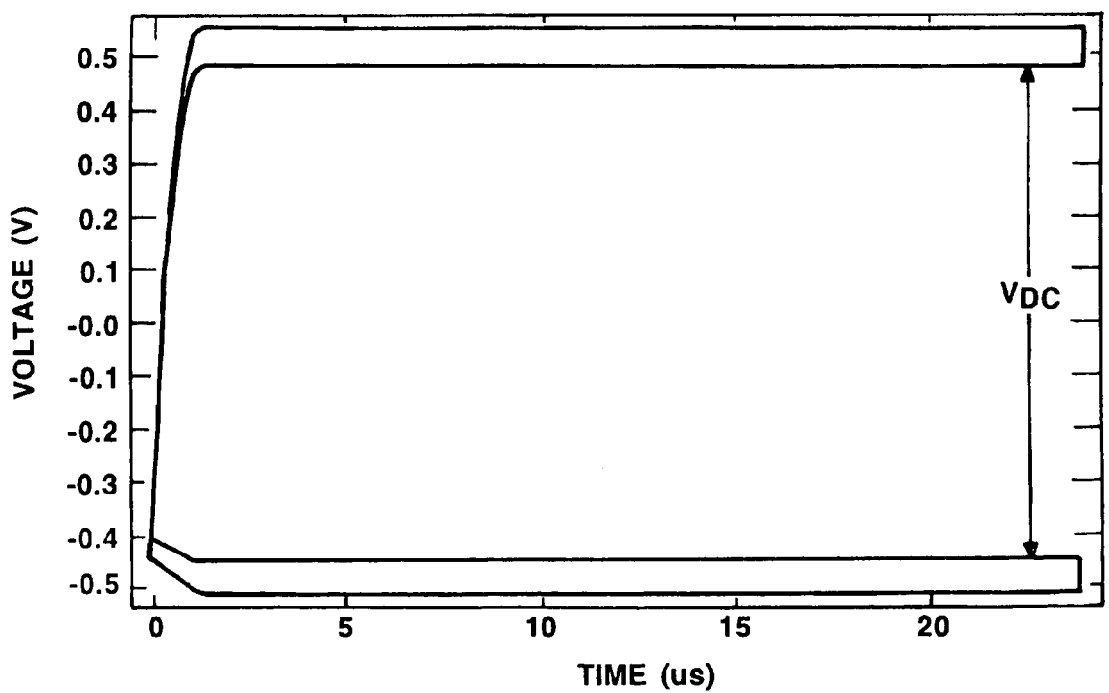
FIG. 7 is a plot of the simulated response of the rectifier circuit of FIG. 5 in response to an input RF signal having a peak-to-peak amplitude of 0.5 V.

FIG. 7 shows the results of a SPICE simulation 140 of the switching rectifier implemented in a 0.5 μm CMOS process with W/L=300 for both PMOS and NMOS devices. The input RF voltage amplitude $V_{RF}$ was 0.5 V at 900 MHz. The charging time for a load capacitance $C_L$ =50 pF was 1 μs.

Figure 8:
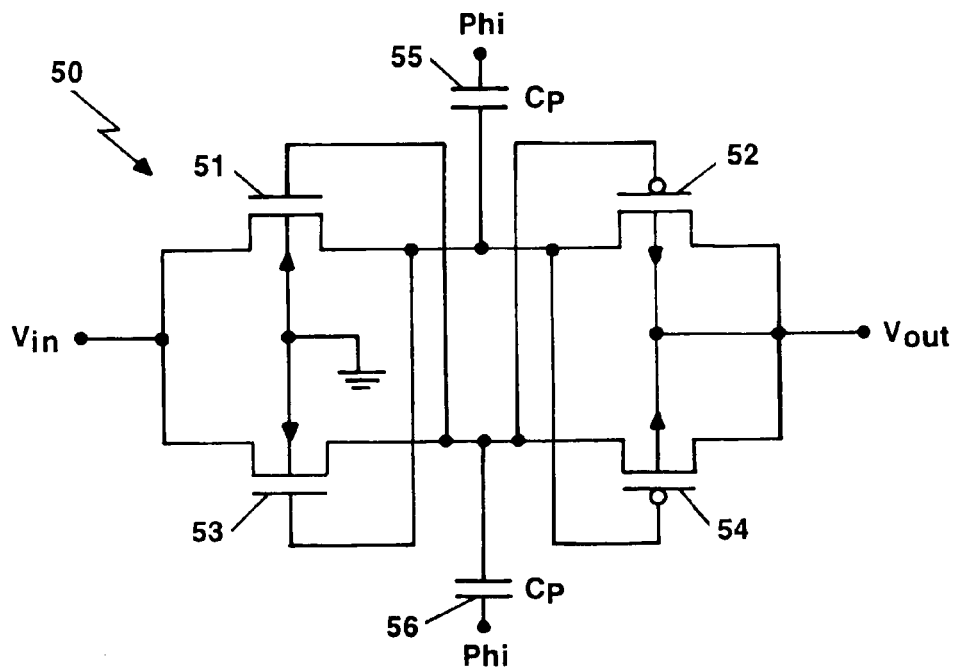
FIG. 8 is a schematic diagram of a charge pump cell.

Another technique for performing far-field RF power extraction uses charge pumps to increase the rectified output voltage. Since the input RF amplitude is extremely low (insufficient to operate the circuitry needed by the tag), charge pumps are used to increase the output DC voltage. FIG. 8 shows a single charge pump cell 50 using cross-coupled charge transfer switches. The differential RF input voltages φ and $\bar{\phi}$ are used to pump charge unilaterally through the pump capacitors $C_P$ 55, 56, thus making $V_{OUT}>V_{IN}$. The circuit works as follows. When φ is high (=$V_{RF}$ in this case), the bottom PMOS transistor 54 and the upper NMOS transistor 51 are turned on, while the other two transistors 52 and 53 are turned off. The other end of the pump capacitor 56 connected to φ is charged to its previous value (=$V_{IN}$)+$V_{RF}$ Current flows through the PMOS transistor 54 from this node, charging up the output towards (approximately) $V_{IN}$+$V_{RF}$. At the same time, the upper NMOS transistor 51 charges the other end of the pump capacitor 55 connected to $\bar{\phi}$ to $V_{IN}$ The whole procedure is repeated during the opposite phase, when the RF input polarities are reversed. During this phase, the upper PMOS transistor 52 and the lower NMOS transistor 53 turn on, the other two transistors 51 and 54 turn off and the output is again charged towards $V_{IN}$+$V_{RF}$.

Ideally, $V_{OUT}=V_{IN}+V_{RF}$, i.e., a single cell acts as a voltage adder—it adds the RF amplitude to the input voltage. By cascading N of these cells in series, the output voltage is increased under no load conditions to (N+1)$V_{RF}$, where the input voltage to the first cell is assumed to be $V_{RF}$. Practically, parasitic capacitances to ground at the charge pumping nodes and increasing body bias effects on the NMOS devices limit the available voltage gain. This assumes that a typical n-well CMOS process is being used. This limitation can be removed if a more expensive dual-well process is used instead. In addition, by reversing the input and output terminals, the same circuit can be used to pump charge in the reverse direction and thereby generate large negative voltages. By combining charge pumps pumping in opposite directions with the switching rectifier described previously (which is assumed to generate approximately 2 $V_{RF}$ across its outputs), an output DC voltage of 2(N+1)$V_{RF}$ can be generated.

Figure 9:
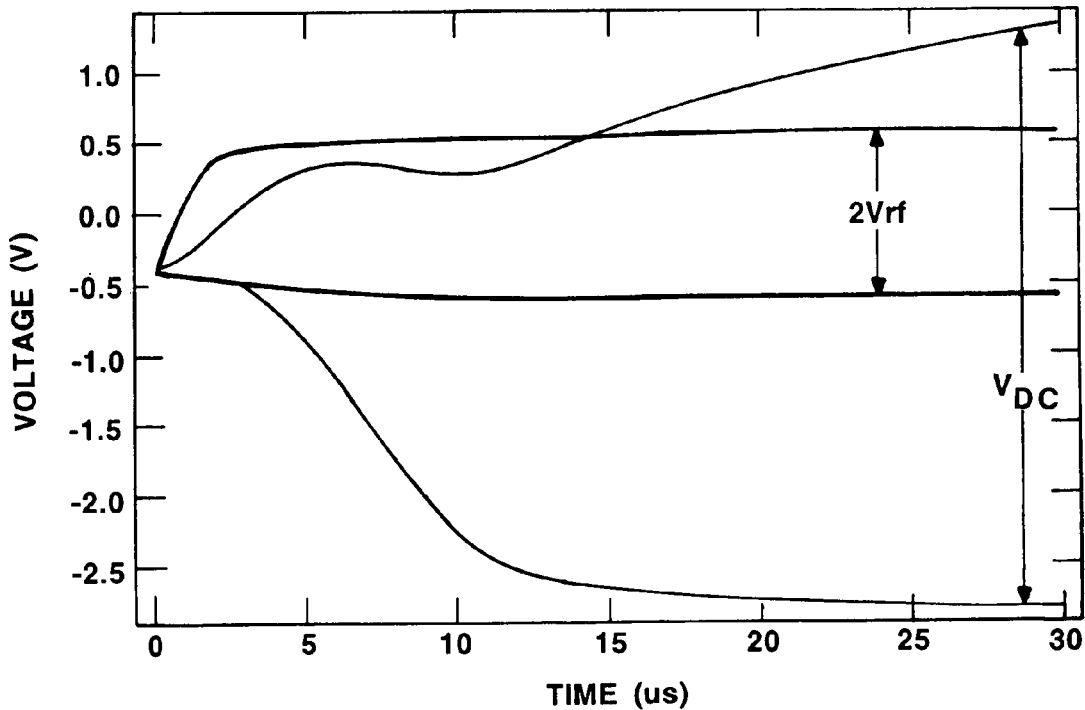
FIG. 9 is a plot showing the stimulated response of the charge pump-switching rectifier combination shown in FIG. 1 in response to an input RF signal having a peak-to-peak amplitude of 0.55 V.

FIG. 9 shows the result of a SPICE simulation 57 of the switching rectifier 40 of FIG. 5 combined with the charge pump 50 shown in FIG. 8 implemented in a 0.5 μm CMOS process. Width (W)/Length(L)=60 for the devices in the switching rectifier, the pump capacitance $C_P$=1 pF and 2 cascaded cells were used to pump charge in each direction (N=2). The overall system was similar to that shown in FIG. 1, with $C_L$=10 pF. The input RF amplitude $V_{RF}$ was 0.55 V at 900 MHz.

Figure 10:
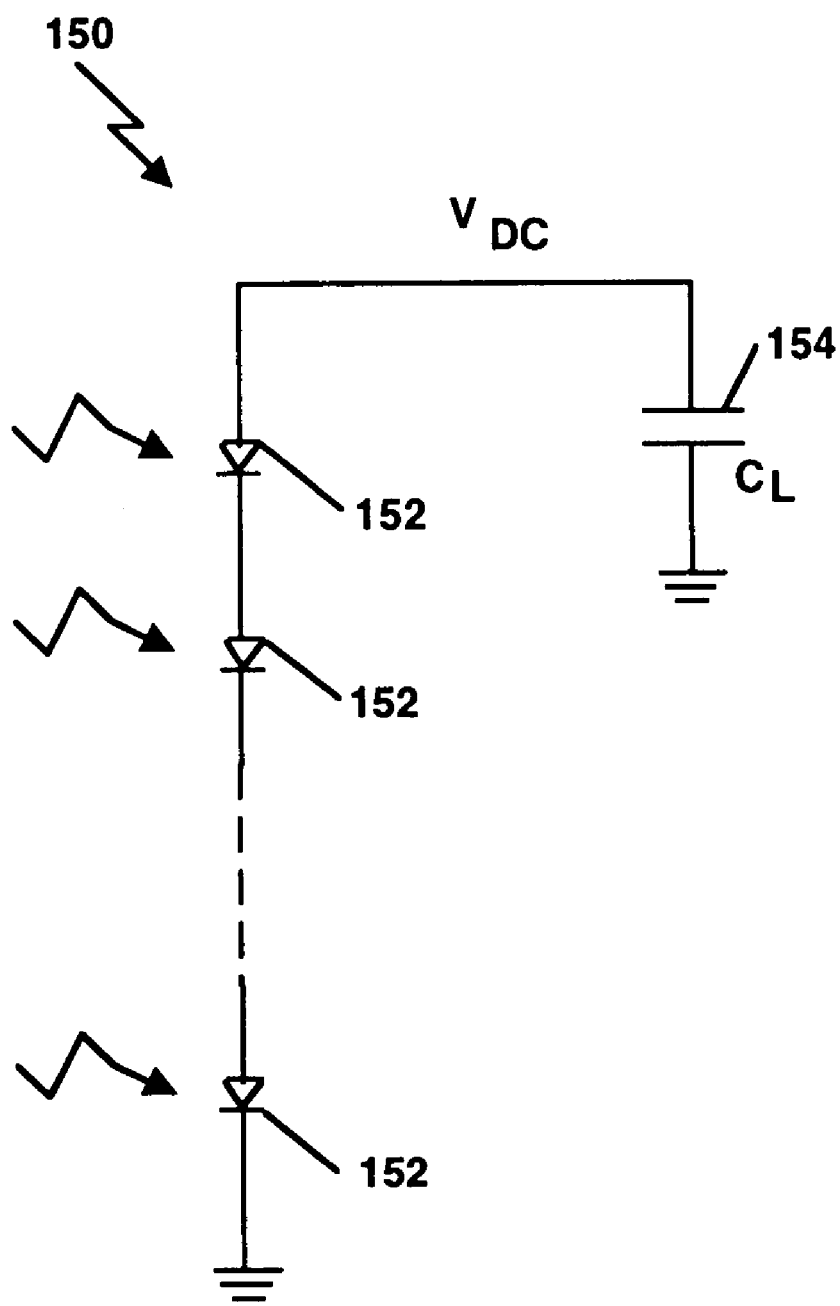
FIG. 10 is a schematic diagram of a solar cell circuit.

The apparatus may utilize solar and other sources of ambient power for starting up the power collection module. For best performance, the power collection module can adapt to changing environmental conditions, for example by automatically adjusting the resonant frequency of the antenna using a feedback tuning network (shown in FIG. 1). However, such adaptation loops consume power, which may not be available from the transmitted RF. To ensure startup power to run the adaptation loops, alternative sources of ambient power (apart from the transmitted RF) may be used. The amount of power required from these sources is small (typically in the nano watt range) since the system only needs to adapt slowly (time scale of milliseconds to seconds) and can thus be designed to have very low power consumption. Promising power sources include solar radiation (utilizing light energy using on-chip solar cells), ambient mechanical vibrations (using MEMS transducers), thermal gradients (using thermoelectric materials) and the like. FIG. 10 shows a solar cell structure 150 which can be used to provide startup power for the power collection module. The solar cell structure uses 3 solar diodes 152 in series to charge load capacitor 154, thereby providing a D.C. voltage across the load capacitor 154.

Figure 11:
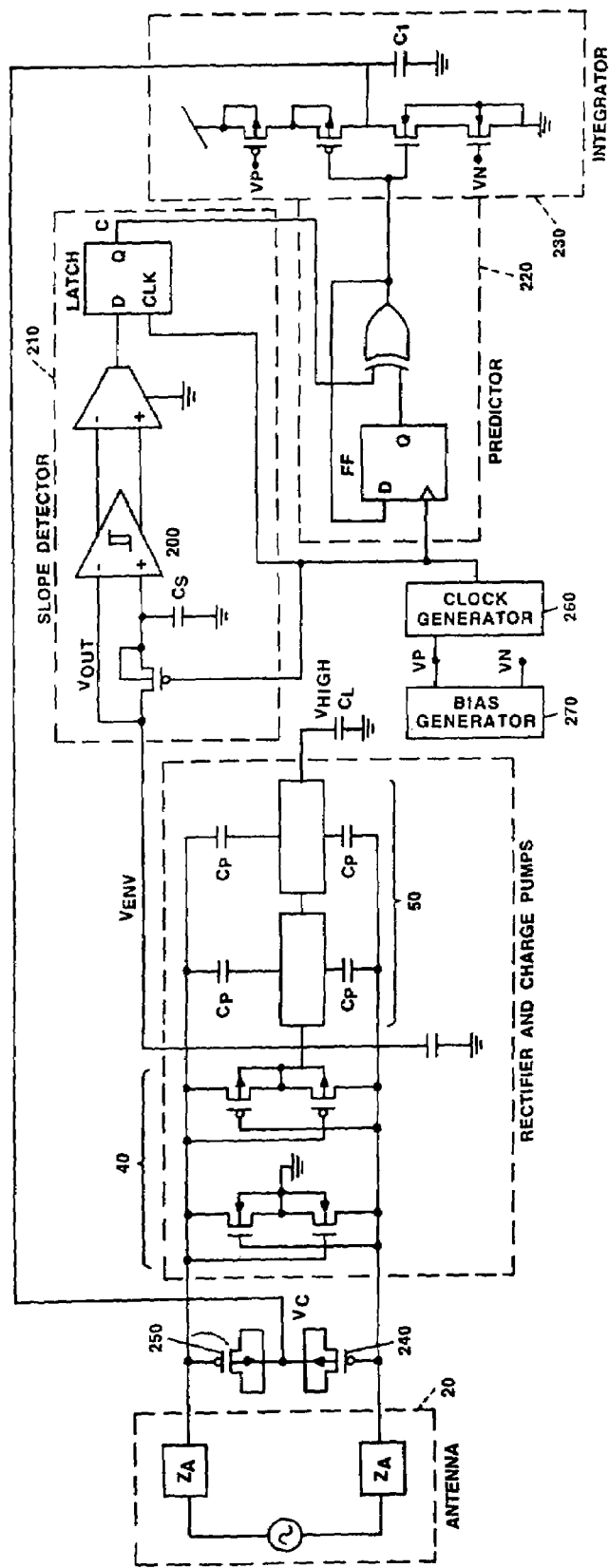
FIG. 11 is a schematic diagram of a controller.

A feedback tuning network 70 is shown in FIG. 11. The objective is to maximize the output DC voltage of the system, subject to a poorly known and possibly time varying open circuit RF amplitude across the antenna terminals. The primary cause of this is antenna resonant frequency variations. The resonant frequency (and other properties, such as the radiation pattern) of the antenna on the power collection module can vary by significant amounts because of variations in nearby environmental conditions. One way to minimize the effects of this variation is to use a broadband antenna, but this lowers the input Q and decreases the power up range. To prevent this, a feedback controller 70 is used to regulate the antenna resonant frequency (FIG. 11). The controller uses derivative-based control to regulate the antenna resonant frequency. The controller comprises a state machine which operates on the temporal derivative of the rectified RF voltage and tries to keep it positive, i.e., increasing in time. The controller outputs a voltage which is used to control the capacitance of a MOS varactor, thereby controlling the resonant frequency of the antenna.

The controller shown in FIG. 11 can be implemented using subthreshold CMOS logic and consumes very little power. The controller can be powered off the rectified RF supply or from an alternative source of ambient energy, such as a solar cell. Two controllers running in different frequency ranges can be used to adapt the resonant frequency to variations that occur on different time scales. For example, a slow control loop could adjust to mechanical movement around the power collection module, while a faster loop could adjust to more rapidly varying quantities, such as multipath fading effects on the received RF signal.

The output of the switching rectifier ($V_{ENV}$, which is the DC voltage to be maximized) is provided to slope detector 210. Slope detector 210 comprises a PMOS device 202 having a source coupled to the output of the rectifier and charge pumps ($V_{ENV}$), a gate coupled to the clock generator 260 and a drain coupled to storage capacitor 200. The storage capacitor 200 is coupled between the drain of PMOS device 202 and a reference ground. A buffer 212 has a first input coupled to the output of rectifier and charge pumps and a second input coupled to the storage capacitor 200, Buffer 212 provides a first buffer output and a second buffer output. A comparator 214 receives the buffer outputs and provides a comparator output. A latch 216 receives the output of comparator 214 and a clock input, and provides the slope detector output. In use, the output of the rectifier and charge pumps is sampled and held on the capacitor $C_S$ 200 of slope detector 210. This value is compared with the actual value of $V_{ENV}$. This operation is a discrete time approximation to the time derivative, and the output C of the slope detector 210 is a 1-bit estimate of the slope of $V_{ENV}$.

A predictor circuit 220 comprises a latch 222 receiving a clock input and a data input and providing an output to exclusive-or gate 224. The exclusive-or gate 224 also receives the slope detector output and provides a predictor output which is also coupled to data input of latch 222. In use, the predictor takes the current value of C, combines it with information about the previous correction made to the antenna resonant frequency and generates a control signal. This control signal is fed into an integrator 230.

Integrator 230 comprises a PMOS device 232 receiving a positive bias voltage at a gate, having a source coupled to a reference voltage VP and providing an output at a drain. A second PMOS device 234 has a source coupled to drain of PMOS device 232, a gate coupled to the output of predictor 220 and a drain providing an output of the integrator 230. Integrator 230 further includes an NMOS device 238 receiving a negative bias voltage VN at a gate, having a source coupled to a reference ground and provides an output at a drain. The second NMOS device 236 has a source coupled to NMOS device 238, a gate coupled to output of predictor 220 and a drain couple dot the drain of PMOS device 234 and also providing an output of integrator 230.

The integrator 230 output voltage $V_C$ controls the antenna resonant frequency by changing the capacitance of the MOS varactors 240, 250 connected across the antenna output terminals. In the preferred implementation that is shown in FIG. 11, the predictor control law is defined as:

$$\Delta V_{C,n+1} = C \oplus \Delta V_{C,n}$$

where $\Delta V_{C,n+1}$ is the new correction to be made to $V_C$, $\Delta V_{C,n}$ was the previous correction, and $\oplus$ denotes the logical XOR operation. This control law is that of a simple 'bang-bang' controller. Every time the controller makes a right decision ($V_{ENV}$ increases and its slope C is positive), it repeats it on the next time step. Every time the controller makes a wrong decision ($V_{ENV}$ decreases and its slope C is negative), it reverses its previous decision on the next time step. An oscillator (clock generator) 260 generates the sampling and timing signals for the rest of the system. Necessary current and voltage biases are generated by a bias generator 270. Typically this takes the form of a supply-independent current reference circuit.

Figure 12:
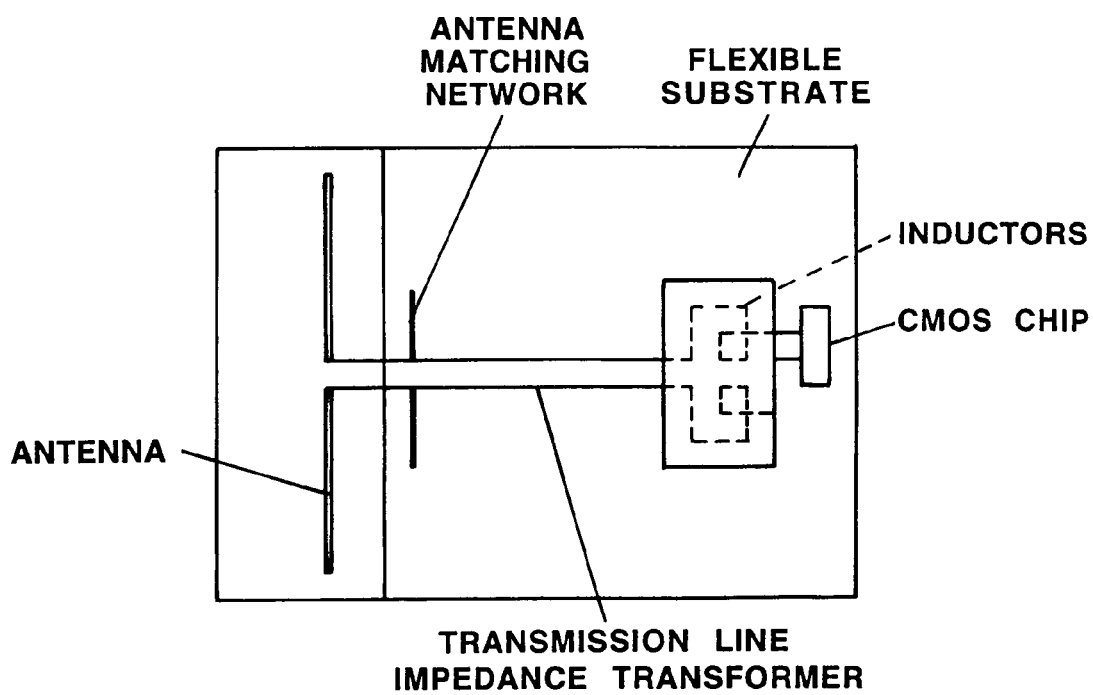
FIG. 12 is a block diagram of an RF power extraction system.

The physical structure of an RF power extraction system is shown in FIG. 12. The input RF signal is captured by the antenna 20. The antenna impedance is matched to the rest of the system using an appropriate matching networks 30. The signal is then passively amplified using a high-Q resonator and fed to CMOS circuitry 80 which rectifies it and generates one or more DC voltages. These DC voltages are then used for powering other circuits on the chip 80, such as an RFID transceiver. The entire system is disposed on a flexible substrate 90.

The present application has focused on RFID tags operating in the UHF frequency band since it is of commercial importance, but the applicability of the present inventions is not confined to this application or frequency band. Since they are of a fairly general nature, the innovations described in thus application can be applied over a broad range of frequencies and power levels for various self-powered applications.

Currently, the minimum RF power threshold for self powered devices is in the 50–60 μW range. By way of implementing one or more of the techniques and circuits described above, this threshold is reduced to 3 μW or below. This results in a concomitant increase in the maximum read range by a factor of 4 over current designs.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A far-field power extraction circuit comprising:
   an antenna configured to receive an electromagnetic radiation signal; and
   a switched rectifier coupled to the antenna, the switched rectifier configured to rectify the electromagnetic radiation signal received by the antenna to produce a direct current (D.C.) voltage at an output, the switched rectifier comprising at least one circuit element having a nonlinear capacitive characteristic.

2. The circuit of claim 1 wherein the antenna comprises at least one of a loop antenna, a dipole antenna, a bowtie antenna or a fractal antenna.

3. The circuit of claim 1 wherein
   the at least one circuit element having a nonlinear capacitive characteristic comprises a non-linear capacitor.

4. The far-field power extraction circuit of claim 3 wherein the nonlinear capacitor is a varactor.

5. The circuit of claim 1 wherein the switched rectifier comprises:
   a first P-type Metal Oxide Semiconductor (PMOS) switch; and
   a second PMOS switch wherein the nonlinear capacitor is coupled to an RF source, a first lead of the nonlinear capacitor is coupled to a source of the first PMOS switch and coupled to a gate of the second PMOS switch, a second lead of the nonlinear capacitor is coupled to a gate of the first PMOS switch and a drain of the second PMOS switch and wherein a drain of the first PMOS switch is coupled to a source of the second PMOS switch and to a load capacitor.

6. The circuit of claim 5, further comprising a first N-type Metal Oxide Semiconductor (NMOS) switch coupled in parallel to the first PMOS Switch and a second NMOS switch coupled in parallel with the second PMOS switch.

7. A far-field power extraction circuit comprising:
   an antenna configured to receive an electromagnetic radiation signal;
   a switched rectifier coupled to the antenna, the rectifier configured to rectify the electromagnetic radiation signal received by the antenna to produce a direct current (D.C.) voltage at an output; and
   an impedance matching network coupled between the antenna and the switched rectifier, the impedance matching network configured to match an antenna impedance with the remainder of the circuit, the impedance matching network comprising transmission line segments comprising inductor-resistor-capacitor line segments.

8. The circuit of claim 7, further comprising a feedback tuning network coupled between the impedance matching network and the output voltage.

9. The circuit of claim 8 wherein the feedback tuning circuit comprises:
   a bias generator;
   a clock generator, wherein the bias generator is coupled to the clock generator;
   a slope detector, wherein the slope detector is coupled to the switched rectifier and said charge pumps;
   a predictor, wherein the clock generator is coupled to the slope detector and the predictor;
   an integrator,
   a first varactor; and
   a second varactor wherein the integrator is coupled to the predictor and to the first and second varactors; wherein said first and second varactors are coupled to the antenna; and
   wherein the feedback tuning circuit controls a resonant frequency of the antenna by changing a capacitance of the first and second varactors coupled across output terminals of the antenna.

10. The circuit of claim 9 wherein the slope detector comprises:
    a PMOS device having a source coupled to the output of said switched rectifier, a gate coupled to the clock generator and a drain;
    a storage capacitor coupled between the drain of the PMOS device and a reference ground;
    a buffer having a first input coupled to the output of said switched rectifier and a second input
    coupled to the storage capacitor, the buffer providing a first buffer output and a second buffer output;
    a comparator receiving said first buffer output and the second buffer output and providing a comparator output; and
    a latch receiving the output of the comparator and a clock input, the buffer providing a slope detector output.

11. The circuit of claim 9 wherein the predictor comprises:
    a latch receiving a clock input and a data input and providing a latch output;
    an exclusive-or gate receiving the latch output at a first input, receiving a slope detector output at a second output and providing a predictor output at the output and wherein the predictor output is coupled to the data input of the latch.

12. The circuit of claim 9 wherein the integrator comprises:
    a first PMOS device receiving a positive bias voltage at a gate, having a source coupled to a reference voltage and providing an output at a drain;
    a second PMOS device having a source coupled to the drain of the first PMOS device, a gate coupled to an output of the predictor and a drain providing an output of the integrator;
    a first NMOS device receiving a negative bias voltage at a gate, having a source couple dot a reference ground and providing an output at a drain;
    a second NMOS device having a source coupled to the first NMOS device, a gate coupled to an output of said predictor and a drain providing an output of the integrator.

13. The circuit of claim 9 wherein the first varactor comprises a PMOS device having a source and a drain coupled together and to the output of said integrator and having a gate coupled to said antenna.

14. The circuit of claim 9 wherein the second varactor comprises PMOS device having a source and a drain coupled together and to the output of the integrator and having a gate coupled to the antenna.

15. The circuit of claim 7 wherein the antenna and impedance matching network are responsive to radio frequency signals having a frequency of about 900 MHz.

16. The circuit of claim 7 wherein the transmission line segments have exponentially tapering cut-off frequencies.

17. The circuit of claim 7 wherein the impedance matching network comprises at least one inductor coupled between the antenna and the remainder of the power extraction system.

18. A far-field power extraction circuit comprising:
    an antenna configured to receive an electromagnetic radiation signal;
    a switched rectifier coupled to the antenna, the rectifier configured to rectify the electromagnetic radiation signal received by the antenna to produce a direct current (D.C.) voltage at an output; and a charge pump coupled to an output of the switched rectifier, wherein the charge pump comprises:
- a first N-type Metal Oxide Semiconductor (NMOS) switch, wherein an input voltage is coupled to a source of the first NMOS switch, and wherein a substrate of the first NMOS switch is coupled to ground;
- a second NMOS switch, wherein the input voltage is coupled to a source of the second NMOS switch, and wherein a substrate of the second NMOS switch is coupled to ground;
- a first P-type Metal Oxide Semiconductor (PMOS) switch; and
- a second PMOS switch, wherein a drain of the first PMOS switch, a drain of said second NMOS switch, a substrate of the first PMOS switch and a substrate of the second PMOS switch are coupled together and provide an output voltage.

19. The circuit of claim 18 wherein the charge pump is coupled to a positive output of the switched rectifier.

20. The circuit of claim 18 wherein the charge pump is coupled to a negative output of the switched rectifier.

21. The circuit of claim 18 wherein the charge pump comprises:
- a first pump capacitor, wherein a gate of the first NMOS switch is coupled to a drain of the second NMOS switch, a gate of the first PMOS switch, a source of the second PMOS switch, and to a first lead of the first pump capacitor; and wherein a second lead of the first pump capacitor is coupled to a first reference signal; and
- a second pump capacitor wherein a gate of the second NMOS switch is coupled to a drain of the first NMOS switch, a gate of the second PMOS switch, a source of the first PMOS switch, and to a first lead of the second pump capacitor; wherein a second lead of the second pump capacitor is coupled to a second reference signal.

22. A far-field power extraction circuit comprising:
an antenna configured to receive an electromagnetic radiation signal; and
a switched rectifier coupled to the antenna, the switched rectifier configured to rectify the electromagnetic radiation signal received by the antenna to produce a direct current (D.C.) voltage at an output, the switched rectifier comprising at least one of the group comprising a rectifier incorporating capacitive nonlinearities, a rectifier using transmission line segments, and a rectifier using one or more switching rectifier circuits,
wherein said switched rectifier incorporating capacitive nonlinearities comprises:
- a variable capacitor;
- a first P-type Metal Oxide Semiconductor (PMOS) switch; and
- a second PMOS switch wherein said variable capacitor is coupled to an RF source, a first lead of said variable capacitor is coupled to a source of said first PMOS switch and coupled to a gate of said second PMOS switch, a second lead of said variable capacitor is coupled to a gate of said first PMOS switch and a drain of said second PMOS switch and wherein a drain of said first PMOS switch is coupled to a source of said second PMOS switch and to a load capacitor.

23. A far-field power extraction circuit comprising:
an antenna configured to receive an electromagnetic radiation signal; and
a switched rectifier coupled to the antenna, the switched rectifier configured to rectify the electromagnetic radiation signal received by the antenna to produce a direct current (D.C.) voltage at an output, the switched rectifier comprising at least one of the group comprising a rectifier incorporating capacitive nonlinearities, a rectifier using transmission line segments, and a rectifier using one or more switching rectifier circuits,
wherein the transmission line segments have exponentially tapering cut-off frequencies.

24. A far-field power extraction circuit comprising:
an antenna configured to receive an electromagnetic radiation signal;
a switched rectifier coupled to the antenna, the switched rectifier configured to rectify the electromagnetic radiation signal received by the antenna to produce a direct current (D.C.) voltage at an output, the switched rectifier comprising at least one of the group comprising a rectifier incorporating capacitive nonlinearities, a rectifier using transmission line segments, and a rectifier using one or more switching rectifier circuits; and
at least one charge pump coupled to an output of the rectifier,
wherein the at least one charge pump comprises:
- a first N-type Metal Oxide Semiconductor (NMOS) switch, wherein an input voltage is coupled to a source of the first NMOS switch, and wherein a substrate of the first NMOS switch is coupled to ground;
- a second NMOS switch, wherein the input voltage is coupled to a source of the second NMOS switch, and wherein a substrate of the second NMOS switch is coupled to ground;
- a first P-type Metal Oxide Semiconductor (PMOS) switch; and
- a second PMOS switch, wherein a drain of the first PMOS switch, a drain of said second NMOS switch, a substrate of the first PMOS switch and a substrate of the second PMOS switch are coupled together and provide an output voltage;
- a first pump capacitor, wherein a gate of said first NMOS switch is coupled to a drain of said second NMOS switch, a gate of said first PMOS switch, a source of said second PMOS switch, and to a first lead of said first pump capacitor; and wherein a second lead of said first pump capacitor is coupled to a first reference signal; and
- a second pump capacitor wherein a gate of said second NMOS switch is coupled to a drain of said first NMOS switch, a gate of said second PMOS switch, a source of said first PMOS switch, and to a first lead of said second pump capacitor; wherein a second lead of said second pump capacitor is coupled to a second reference signal.

25. A far-field power extraction circuit comprising:
an antenna configured to receive an electromagnetic radiation signal;
a switched rectifier coupled to the antenna, the switched rectifier configured to rectify the electromagnetic radiation signal received by the antenna to produce a direct current (D.C.) voltage at an output, the switched rectifier comprising at least one of the group comprising a rectifier incorporating capacitive nonlinearities, a rectifier using transmission line segments, and a rectifier using one or more switching rectifier circuits;

an impedance matching network coupled between the antenna and the switched rectifier, the impedance matching network configured to match an antenna impedance with the remainder of the circuit; and a feedback tuning network coupled between the impedance matching network and the output voltage, the feedback tuning circuit comprising:

a bias generator;

a clock generator, wherein the bias generator is coupled to the clock generator;

a slope detector, wherein the slope detector is coupled to the switched rectifier and said charge pumps;

a predictor, wherein the clock generator is coupled to the slope detector and the predictor;

an integrator, a first varactor; and a second varactor, the integrator being coupled to the predictor and to the first and second varactors; wherein the first and second varactors being coupled to the antenna, wherein the feedback tuning circuit controls a resonant frequency of the antenna by changing a capacitance of the first and second varactors coupled across output terminals of the antenna.

* * * * *

UNITED STATES PATENT AND TRADEMARK OFFICE
CERTIFICATE OF CORRECTION

PATENT NO. : 7,167,090 B1
APPLICATION NO. : 10/944676
DATED : January 23, 2007
INVENTOR(S) : Soumyajlt Mandal et al.

It is certified that error appears in the above-identified patent and that said Letters Patent is hereby corrected as shown below:

Column 2, line 57, delete "embodiment the" and replace with -- embodiment, the --.

Column 3, line 64, delete "RE power" and replace with -- RF power --.

Column 5, line 20, delete "$2V_{RF}$ Note that" and replace with -- $2V_{RF}$. Note that --.

Column 5, line 22, delete "switches This" and replace with -- switches. This --.

Column 5, line 45, delete "cosh $\left(\frac{\kappa V_{DC}}{V_T}\right)$" and replace with -- cosh $V_T = \frac{kT}{q}$ --.

Column 5, line 67, delete "$(=V_{IN}) + V_{RF}$ Current" and replace with -- $(=V_{IN}) + V_{RF}$. Current --.

Column 6, line 4, delete "$V_{IN}$The" and replace with -- $V_{IN}$. The --.

Column 6, line 58, delete "D.C." and replace with -- DC --.

Column 7, line 33, delete "of rectifier" and replace with --of the rectifier--.

Column 7, line 34, delete "capacitor 200, Buffer" and replace with --capacitor 200. Buffer --.

Column 7, line 58, delete "coupled to drain of" and replace with -- coupled to a drain of --.

Column 7, line 65, delete "to output" and replace with -- to an output --.

Column 7, line 66, delete "a drain couple dot the" and replace with -- a drain coupled to the --.

Column 8, line 25, delete "networks 30." and replace with -- network 30. --

Column 8, line 38, delete "in thus application" and replace with -- in this application --.

Column 8, line 41-42, delete "Self powered" and replace with -- Self-powered --.

Column 8, lines 48-49, delete "invention it" and replace with -- invention, it --.

Column 8, line 62, delete "submitted that that the" and replace with -- submitted that the --.

UNITED STATES PATENT AND TRADEMARK OFFICE
CERTIFICATE OF CORRECTION

PATENT NO. : 7,167,090 B1
APPLICATION NO. : 10/944676
DATED : January 23, 2007
INVENTOR(S) : Soumyajlt Mandal et al.

It is certified that error appears in the above-identified patent and that said Letters Patent is hereby corrected as shown below:

Column 10, line 51, delete "comprises PMOS device" and replace with -- comprises a PMOS device --.

Signed and Sealed this

Twenty-second Day of May, 2007

JON W. DUDAS
*Director of the United States Patent and Trademark Office*